(12) United States Patent
Poliakine et al.

(10) Patent No.: US 7,495,718 B2
(45) Date of Patent: Feb. 24, 2009

(54) STRUCTURALLY SUPPORTED LCD MEDIA

(75) Inventors: Ran Poliakine, Motza Ilit (IL); David Coates, Wimbourne (GB)

(73) Assignee: Magink Display Technologies Ltd, Mevasseret Zion (IL)

( * ) Notice: Subject to any disclaimer, the term of this patent is extended or adjusted under 35 U.S.C. 154(b) by 0 days.

(21) Appl. No.: 10/575,089

(22) PCT Filed: Oct. 10, 2004

(86) PCT No.: PCT/IL2004/000926

§ 371 (c)(1),
(2), (4) Date: Mar. 1, 2007

(87) PCT Pub. No.: WO2005/034069

PCT Pub. Date: Apr. 14, 2005

(65) Prior Publication Data

US 2007/0153210 A1  Jul. 5, 2007

(30) Foreign Application Priority Data

Oct. 9, 2003 (IL) ........................ 158339

(51) Int. Cl.
*G02F 1/1347* (2006.01)
(52) U.S. Cl. ........................ 349/74; 349/158
(58) Field of Classification Search ........... 349/73, 349/151, 153, 138, 113, 86, 189, 158, 110, 349/74, 88, 155, 156, 190
See application file for complete search history.

(56) References Cited

U.S. PATENT DOCUMENTS

| | | | |
|---|---|---|---|
| 6,094,244 A | | 7/2000 | Kawata et al. |
| 6,147,726 A | * | 11/2000 | Kubota et al. ............... 349/74 |
| 6,697,039 B1 | * | 2/2004 | Yamakawa et al. .......... 345/98 |
| 6,812,977 B1 | | 11/2004 | Iwamatsu et al. |
| 6,844,957 B2 | * | 1/2005 | Matsumoto et al. ........ 359/296 |
| 7,170,481 B2 | * | 1/2007 | Doane et al. ................ 345/87 |

OTHER PUBLICATIONS

Written Opinion of the International Searching Authority mailed Oct. 17, 2007.
International Search Report for International Application No. PCT/IL04/00926 mailed Oct. 17, 2007.

* cited by examiner

*Primary Examiner*—Thoi V Duong
(74) *Attorney, Agent, or Firm*—Pearl Cohen Zedek Latzer, LLP

(57) ABSTRACT

A structurally supported LCD media comprising: an initial structural layer; a plurality of addressable layers, each of which having predetermined optical properties, and the layers have LC there-between and have narrow conductive pathways on opposing faces which respectively address a predetermined LC volume between the pathways, and the pathways are respectively accessible for interconnection with a LC electric pulse driving means; a final structural layer being of predetermined optically transparency to frequencies of light scattered by at least one of the other layers; and means for sealing the initial layer to the final layer with the addressable layers there-between.

7 Claims, 2 Drawing Sheets

STRUCTURALLY SUPPORTED LCD MEDIA

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to low cost Liquid Crystal Displays (LCDs).

More specifically, the present invention relates to a composite materials approach to fabrication of LCDs.

BACKGROUND OF THE INVENTION

LCDs are typically fabricated using parallel pairs of structurally rigid & precision flat sheet glass having an addressable conductive pattern on respective facing surfaces and having a liquid crystal based material there-between. Glass is presently the preferred media because of its optical properties, its structural properties, its chemical properties (being impermeable to moisture and oxygen) and because it facility to edge sealing or interstitial sealing. Furthermore, in order to maintain the parallel orientation, precision spacers (e.g. micro spheres) are distributed between the plates, albeit obscure fabrication methods utilize precise deposition to accomplish the spacing.

Because the cost of structurally rigid & precision flat sheet glass increases greatly with the size of the sheets, large and very large LCDs are disproportionably more expensive than hand held displays or watch face size displays.

Accordingly, there is a long felt need in the industry to reduced the cost of large and very large LCDs. Furthermore, additional cost reductions for hand held displays or watch face size displays would also be appreciated as advantageous to the industry, since manufacture of small scale LCDs has become highly competitive.

BRIEF SUMMARY OF THE INVENTION

The aforesaid longstanding needs are significantly addressed by embodiments of the present invention, which specifically relates to structurally supported LCD media. The instant apparatus is especially useful in lowering costs for LCD fabrication.

The instant invention specifically relates to embodiments of a Structurally supported LCD media comprising: (A) a initial structural layer; (B) a plurality of addressable layers, each of which having predetermined optical properties, and the layers have LC there-between and have narrow conductive pathways on opposing faces which respectively address a predetermined LC volume between the pathways, and the pathways are respectively accessible for interconnection with a LC electric pulse driving means; (C) a final structural layer being of predetermined optically transparency to frequencies of light scattered and/or reflected by at least one of the other layers; and (D) means for sealing the initial layer to the final layer with the addressable layers there-between, and having there-through a continuation of said respective accessible interconnection.

Simply stated, embodiments of the instant invention facilitate use of cheap plastic sheet to be used roll-to-roll and thereafter cut up and laminated with cheap glass. This allows large area cheap LC displays by enclosure of a stack of films into a "sandwich".

According to one embodiment, the initial structural layer is a rigid material (e.g. glass, composite, metal, or the likes) having an inert surface (innately, by coating, by preparation, or the likes) facing the final layer. According to the a special variation of this embodiment, the inert surface is an applied coating/deposition on the surface.

According to a special embodiment, the initial structural layer is glass. While according to a further embodiment, the initial structural layer is selected from the list: metal, plastic, and composite material.

According to a different embodiment, the initial structural layer has a surface preparation of predetermined spectral properties (generally optically black—but often tinted, textured, selectively filtered, or the likes) facing the final layer.

According to yet another embodiment, at least one of the plurality of addressable layers is made from a plastic film. However, according to still a further embodiment, at least one of the plurality of addressable layers is made from a glassy film. While according to an additional embodiment, at least one of the plurality of addressable layers is made from a plastic sheet.

According to a novel embodiment, the narrow conductive pathways are selected from the list: Indium Tin Oxide, carbon nanotubes, or the likes. According to another novel embodiment, at least two adjacent layers of the plurality of addressable layers are separated by precision width gaping spacers selected from the list: micro-particles, deposition members, at least one mesh, a randomized network layer, a lattice structured network layer, a highly perforated membrane or the likes.

According to a further novel embodiment, the final structural layer is a glass sheet.

According to still a further fundamental embodiment, the initial structural layer and the plurality of addressable layers and the final structural layer in combination provide a predetermined measure of rigidity that is compliant with a predetermined measure of integrity for the initial layer to final layer sealing.

Essentially, this means that the entire structurally supported LCD media might be bent or flexed so long as that does not disrupt the sealing between the initial and final layer. More particularly, according to the preferred variation of this embodiment, at least two adjacent layers of the plurality of addressable layers are separated by precision width gaping spacers selected from the list: micro-particles, deposition members, mesh, randomized network layer, lattice structured network layer, and highly perforated membrane; and wherein the predetermined measure of rigidity also includes the structural contribution of the precision width gaping spacers. Thus, as the initial structural layer or as the final structural layer (and incidently as any of the addressable layers) a barier multi-layer laminate "film" may be included that statistically preventing oxygen or moisture percolation—due to the gross improbability of aligned defects between layers of the laminate. For example using PET film alternated with silicon dioxide or aluminum oxide and/or organic intermediate layers result in clear or opaque micro-laminates.

A commercial product by Vitex (called Barix-tm) fulfills this functional specification. "The bulk permeability of even a thin inorganic layer of silicon dioxide (glass) or aluminum oxide (ceramic) is essentially zero—they are perfect barriers. So why does a coating of these materials on a plastic film allow the passage of water or oxygen? The reason is that to produce an impermeable barrier, such a coating must be continuous and free of any defects. However, when applied to a plastic surface, these coatings perform as though they are riddled with holes. Microscopic inspection shows why: the surface of the plastic is not smooth. On a molecular scale, it is a landscape of mountains and valleys. Each mountain peak and valley bottom creates a moisture path known as a grain boundary defect. Increasing the thickness of the inorganic layer does not solve the problem. The point and line defects grow right along with the thickness of the film, so that cracks and holes go clear through the inorganic layer, allowing moisture to penetrate and damage the display. Vitex's VPT technology proposed to solve this dilemma." However, other simpler laminates are also substantially sufficient in the context of the instant invention. Alternatively, the LC materials may be encapsulated into addressable micro-cells, which are respectively held in relative position by the initial and final structural layers.

According to a basic embodiment, the structurally supported LCD media (substantially as herein described and illustrated) is characterized by having means for (moisture & oxygen impermeable) sealing the initial layer to the final layer. Essentially this takes the form of two basic embodiments. Firstly, an embodiment whereby the initial and final structural layers collectively with the sealing means provide the isolation of the LC from environmental moisture and oxygen. Secondly, an embodiment whereby micro-cells of LC in the interstitial regions are structurally maintained in respective position by the initial and final structural layers and the sealing means—albeit the environmental isolation is provided by the micro-cell encapsulation or by the lamination of interstitial layers (in conjunction with gaping spacer structure).

Plastic LCD in a glass sandwich. In the future it is possible that LCD's could be made on a roll to roll basis and thus make them very cheap. Cheap plastic substrates have poor barrier properties to water and oxygen. 'Engineered' plastic film with barrier layers is very expensive. This idea takes cheap plastic and encloses it between thin glass sheets that act as barrier layers and can be also helpful in making the device more rigid when this is required.

Notices

Numbers, alphabetic characters, and roman symbols are designated in the following sections for convenience of explanations only, and should by no means be regarded as imposing particular order on any method steps. Likewise, the present invention will forthwith be described with a certain degree of particularity, however those versed in the art will readily appreciate that various modifications and alterations may be, carried out without departing from either the spirit or scope, as hereinafter claimed.

In describing the present invention, explanations are presented in light of currently accepted Scientific or Technological theories and models. Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations herein, related to these embodiments, are presented for the purpose of teaching, the current man of the art or the current team of the art, how these embodiments may be substantially realized in practice. Alternative or equivalent explanations for these embodiments may neither deny nor alter their realization.

BRIEF DESCRIPTION OF THE DRAWINGS

In order to understand the invention and to see how it may be carried out in practice, embodiments including the preferred embodiment will now be described, by way of non-limiting example only, with reference to the accompanying drawings. Furthermore, a more complete understanding of the present invention and the advantages thereof may be acquired by referring to the following description in consideration of the accompanying drawings, in which like reference numbers indicate like features and wherein.

DETAILED DESCRIPTION OF THE INVENTION

Figure 1:
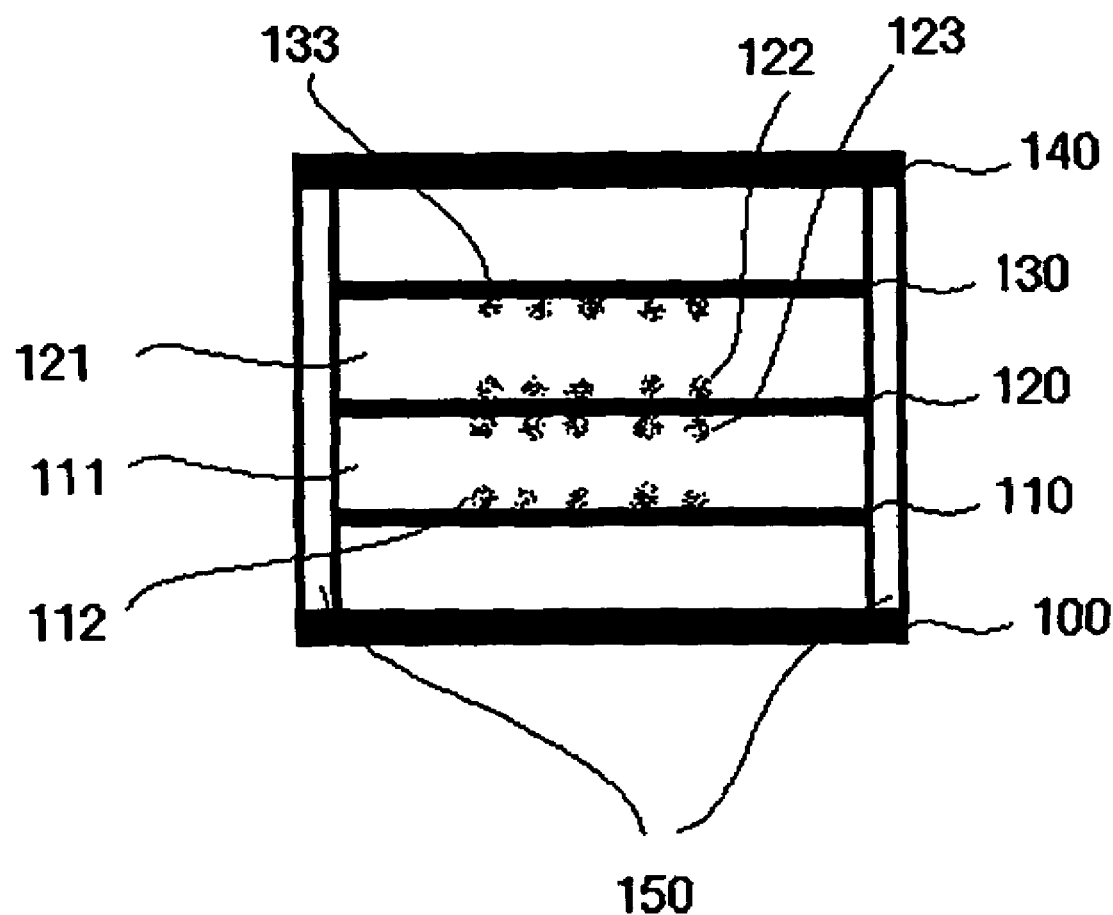
FIG. 1 illustrates a schematic lateral side view of a structural supported LCD media embodiment.

The instant invention relates to embodiments (SEE FIG. 1) of a Structurally supported LCD media comprising: (A) a initial structural layer 100; (B) a plurality of addressable layers, each of which having predetermined optical properties 110 120 130, and the layers have LC 111 121 there-between and have narrow conductive pathways 112 122 123 133 on opposing faces which respectively address a predetermined LC volume between the pathways, and the pathways are respectively accessible for interconnection with a LC electric pulse driving means; (C) a final structural layer 140 being of predetermined optically transparency to frequencies of light scattered and/or reflected by at least one of the other layers; and (D) means for sealing 150 the initial layer to the final layer with the addressable layers there-between, and having there-through a continuation of said respective accessible interconnection.

Regarding the means for sealing, one needs a specification for water and oxygen transport through a substrate into a liquid crystal film that is very low [while PET (Polyethylene terephthalate) for example has very high transport properties:

|  | Water (g/m$^2$/day) | Oxygen (cc/bar/m$^2$/day) |
| --- | --- | --- |
| Target | <10$^{-2}$ | <10$^{-2}$ |
| PET film (1 mil) | 40 | 160 |

Glass (by comparison) has almost zero permeation of water and oxygen.

It is possible to obtain from Agfa a laminate of glass and plastic that is 450 um thick which is flexible. It is sold as a substrate for displays and security cards, semiconductor devices etc. (see http:/www.yet2.com/nasatech/240). It is patented for used in LCD's.

Schott and others sell very thin glass of 50 um thick, this is expensive and while flexible is also brittle. Borosilicate glass is less breakable than sodium or chemically hardened glass so is preferred in these applications.

The disadvantage of using this thin glass is that it comes in sheets not rolls so roll to roll manufacture is not an option. The plastic/glass laminate is possibly a roll although this is not emphasized strongly in the technical notes.

In preferred instant embodiments of the present invention, the LCD is made by coatings onto cheap transparent conductive-coated cheap plastic and then sandwiched between cheap soda lime glass in sheets of the appropriate size defined by the application and ability to drive the LCD.

Figure 2:
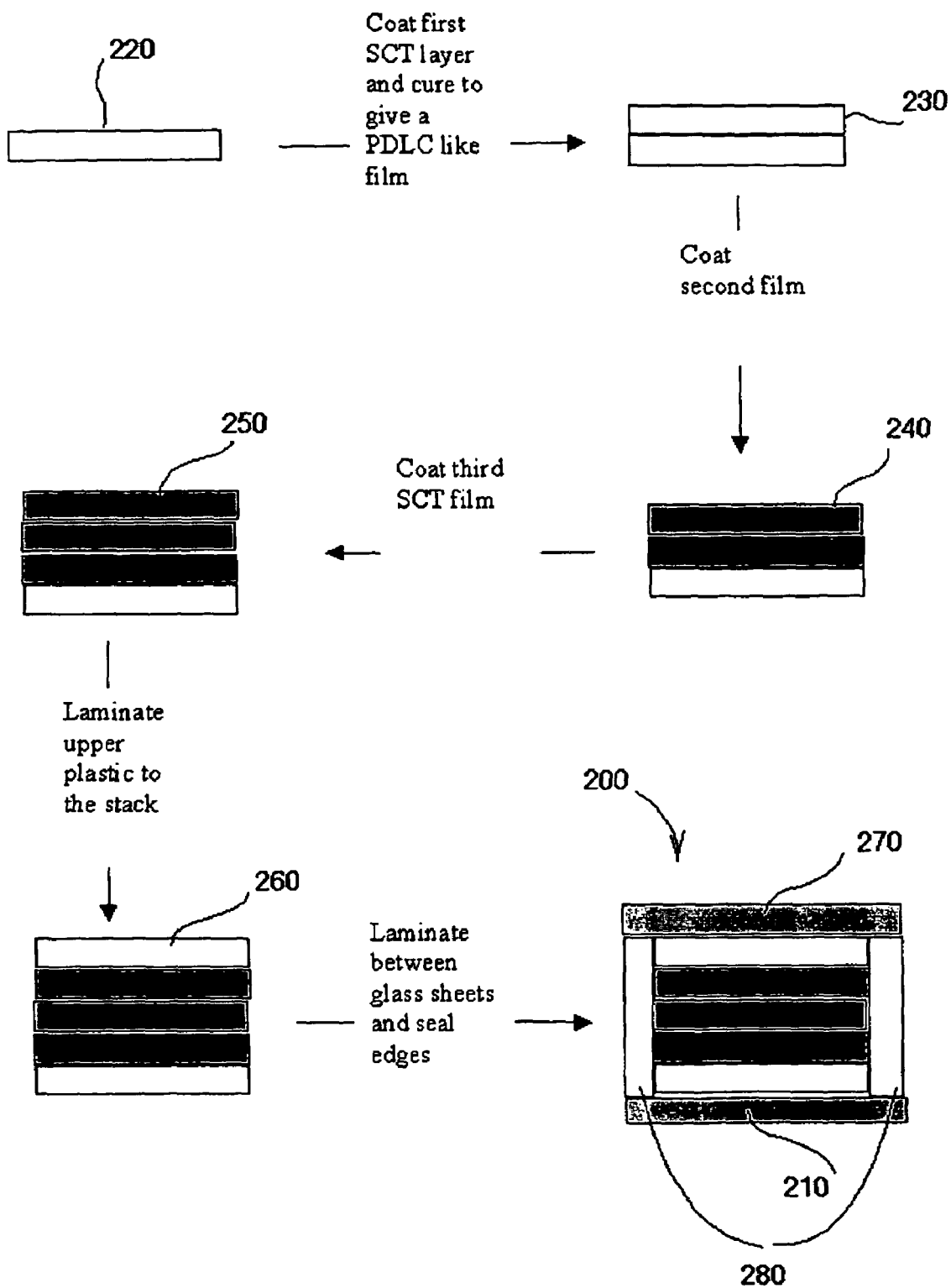
FIG. 2 illustrates a schematic view of sequential steps used to assemble a typical structural supported LCD media embodiment.

The edges of the glass are sealed thus creating an almost hermetic seal for the plastic. (SEE FIG. 2) On the bottom of a Structurally supported LCD media 200 is a initial structural layer 210 supports a stack of: a plastic layer 220, a first coated SCT layer cured to give a PDLC like film 230, a second coated film 240, a third coated SCT film 250, and an upper laminated plastic 260. A final structural layer 270 is being deposits on top of the stack; then there is lamination from the initial structural layer to the final structural layer by a means for sealing 280—with the addressable layers there-between.

Alternatively making individual layers and then stacking these prior to lamination between glasses can make the stack of SCT layers.

Special care should be taken to avoid problems of large mismatch in expansion between glass and plastic but using suitable glues (indeed Agfa have shown this can be done).

Furthermore, it is preferred to limit added weight and loose flexibility of the plastic display. The weight depends on the glass thickness—0.8 mm glass could be used as the plastic will make it tougher. Flexibility is not a big deal, usually ruggedness is more critical and this sandwich would be rugged.

Care should be taken not to include extra steps in lamination—since this will add cost. Furthermore, connection to the device via flexible printed circuits or rigid connectors requires careful selection and may incur a need to electrically connect between plastic and glass.

Briefly, instant embodiments use comparatively cheap substrates (especially for large surface area displays)—and can utilize roll-to-roll manufacture (since the very weak point of plastic devices made roll to roll is to seal the edges, this is overcome). In addition, substantially any device size is possible—and one could attach drivers on the glass (if desired).

Simply stated, instant embodiments use a good and cheap barrier layer (glass) to overcome the barrier layer problem in cheap non-engineered plastics. (Note that the engineering of plastics is usually silicon dioxide layers evaporated onto the plastic.)

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. Structurally supported LCD media comprising:
   an initial structural layer made of glass;
   a plurality of LC layers;
   a plurality of addressable layers, each of which is made from a plastic film or a plastic sheet having predetermined optical properties, the addressable layers being provided on opposite sides of each one of the LC layers, and wherein the layers have narrow conductive pathways on opposing faces of the addressable layers on opposite sides of each one of the LC layers, the pathways respectively addressing a predetermined LC volume between the pathways, and the pathways being respectively accessible for interconnection with a LC electric pulse driving means;
   a final structural layer made of glass and being of predetermined optical transparency to frequencies of light scattered and/or reflected by the LC layers; and
   means for sealing the initial layer to the final layer with the addressable layers and the LC layers there-between, and having there-through a continuation of said respective accessible interconnection.

2. The structurally supported LCD media according to claim 1 wherein the glass initial structural layer has a coating/deposition applied on the surface thereof.

3. The structurally supported LCD media according to claim 1 wherein the initial structural layer has a surface preparation of predetermined structural properties facing the final layer.

4. The structurally supported LCD media according to claim 1 wherein the narrow conductive pathways are selected from the list: Indium Tin Oxide, carbon nanotubes.

5. The structurally supported LCD media according to claim 1 wherein at least two adjacent layers of the plurality of addressable layers are separated by precision width gaping spacers selected from the list: micro-particles, deposition members, at least one mesh, a randomized network layer, a lattice structured network layer, and a highly perforated membrane.

6. The structurally supported LCD media according to claim 1 wherein the initial structural layer and the plurality of addressable layers and the final structural layer in combination provide a predetermined measure of rigidity that is compliant with a predetermined measure of integrity for the initial layer to final layer sealing.

7. The structurally supported LCD media according to claim 6 wherein at least two adjacent layers of the plurality of addressable layers are separated by precision width gaping spacers selected from the list: micro-particles, deposition members, mesh, a randomized network layer, a lattice structured network layer, and a highly perforated membrane; and wherein the predetermined measure of rigidity also includes the structural contribution of the precision width gaping spacers.

* * * * *